(12) United States Patent
Johansson (10) Patent No.: US 7,788,315 B2
(45) Date of Patent: Aug. 31, 2010

(54) INFRASTRUCTURE FOR MANAGEMENT AND COMMUNICATION OF INFORMATION

(75) Inventor: Örjan Johansson, Veberöd (SE)

(73) Assignee: Anoto Aktiebolag (Anoto AB) (SE)

( * ) Notice: Subject to any disclaimer, the term of this patent is extended or adjusted under 35 U.S.C. 154(b) by 2630 days.

(21) Appl. No.: 10/101,615

(22) Filed: Mar. 21, 2002

(65) Prior Publication Data

US 2002/0138568 A1    Sep. 26, 2002

(30) Foreign Application Priority Data

Mar. 21, 2001    (SE)    .................................. 01009901

(51) Int. Cl.
*G06F 15/16* (2006.01)
(52) U.S. Cl. ..................................... 709/203
(58) Field of Classification Search ................. 709/203, 709/223
See application file for complete search history.

(56) References Cited

U.S. PATENT DOCUMENTS

| | | | |
|---|---|---|---|
| 5,612,720 A * | 3/1997 | Ito et al. ..................... | 345/179 |
| 5,661,506 A | 8/1997 | Lazzouni et al. | |
| 5,852,434 A | 12/1998 | Sekendur | |
| 6,076,734 A | 6/2000 | Dougherty et al. | |
| 6,164,541 A | 12/2000 | Dougherty et al. | |
| 6,666,376 B1 * | 12/2003 | Ericson ....................... | 235/454 |
| 6,698,660 B2 * | 3/2004 | Fåhraeus et al. ......... | 235/472.01 |
| 6,836,555 B2 * | 12/2004 | Ericson et al. .............. | 382/116 |
| 6,885,878 B1 * | 4/2005 | Borgstrom et al. ....... | 455/556.1 |
| 2002/0002539 A1 * | 1/2002 | Fahraeus et al. .............. | 705/51 |
| 2002/0034300 A1 * | 3/2002 | Thuvesholmen et al. ..... | 380/256 |
| 2002/0087704 A1 * | 7/2002 | Chesnais et al. ............ | 709/228 |
| 2002/0138568 A1 * | 9/2002 | Johansson ................... | 709/203 |
| 2005/0141060 A1 * | 6/2005 | Rydbeck et al. ............. | 358/512 |

FOREIGN PATENT DOCUMENTS

| | | |
|---|---|---|
| WO | WO 99/39277 | 8/1999 |
| WO | WO 99/50787 | 10/1999 |
| WO | 00/65509 A2 | 11/2000 |
| WO | WO 00/72245 | 11/2000 |
| WO | WO 01/16691 A1 | 3/2001 |
| WO | WO 01/48591 A1 | 7/2001 |
| WO | WO 01/48678 A1 | 7/2001 |
| WO | WO 01/48685 A1 | 7/2001 |
| WO | WO 01/61449 A2 | 8/2001 |
| WO | WO 02/19260 A1 | 3/2002 |

OTHER PUBLICATIONS

XP002328425: Dymetman and Copperman, Intelligent Paper, Xerox Research Center Europe; published in Apr. 1998.

* cited by examiner

*Primary Examiner*—Philip C Lee
*Assistant Examiner*—Jason Recek
(74) *Attorney, Agent, or Firm*—Finnegan, Henderson, Farabow, Garrett & Dunner LLP (57) ABSTRACT

An information management system comprises a product provided with a position code a digital pen capable of reading the position code, a look-up unit, and a plurality of databases connected to the digital pen via a first communication path. The databases include a pen database, a position database, and an event database. The information management system also includes an interface unit, separate from the look-up unit, and used to provide access to the pen database, the position database, and the event database via a second communication path that is separate from the first communication path.

36 Claims, 7 Drawing Sheets

INFRASTRUCTURE FOR MANAGEMENT AND COMMUNICATION OF INFORMATION

FIELD OF THE INVENTION

The present invention generally relates to the field of digital communication, and more specifically to an infrastructure for management and communication of information which is registered with a digital pen.

BACKGROUND OF THE INVENTION

Traditionally, information is written and distributed by means of pen and paper. However, such paper-based information is difficult to manage and communicate in an efficient way.

Computers are to an ever-increasing extent used for management and communication of information. The information is typically input by means of a keyboard and stored in the computer memory, for example on a hard disk. However, it is a slow process to input information with a keyboard, and there is a significant risk of errors occurring in the process. Graphic information, such as drawings and images, is normally fed to the computer through a separate device, such as a scanner or the like. The process of feeding such information to the computer is time-consuming, lengthy, and often yields unsatisfactory results. When the information eventually is located in the computer, it can easily be communicated to other, for example as an e-mail or SMS via an Internet connection, or as a fax via a fax modem.

The present Applicant has proposed a remedy to this problem in the international application WO 01/16691, which is incorporated herein by this reference and in which the Applicant envisages the use of product having a writing surface which is provided with a position code. The position code, which codes a plurality of positions on the surface, enables electronic recording of information that is being written on the writing surface, by means of a digital pen which detects the position code. The product also has one or more activation icons which, when detected by the digital pen, cause the pen to initiate a respective predetermined operation which utilizes the information recorded by the pen.

More specifically, the position-coded product has a built-in functionality, in that different positions on the product, such as positions within the activation icon and positions within the writing surfaces are dedicated for different functions. Furthermore, the position code is capable of coding coordinates of a large number of positions, much larger than the number of necessary positions on the product. Thus, the position code can be seen as forming a virtual space which is defined by all positions that the position code is capable of coding, different positions in the virtual space being dedicated for different functions and/or actors.

The above-concept can be used for a number of different purposes. The combination of pen and position-coded product can be used as an input device to a computer, a PDA, a mobile phone or the like. For example, text and sketches written on a position-coded notepad can be transferred via the pen to a computer. Additionally, the combination of pen and position-coded product allows for global communication, directly from the product via the pen, by the position code on the product being dedicated for such communication. For example, the information registered by the pen can be transformed to a fax message, an e-mail or an SMS, and then be sent from the pen to a recipient. Further, the combination of pen and position-coded product can be used in e-commerce. For example, the digital pen can be used to order an item from a position-coded advertisement in a magazine, by the position code in the advertisement being dedicated for such a service.

Figure 1:
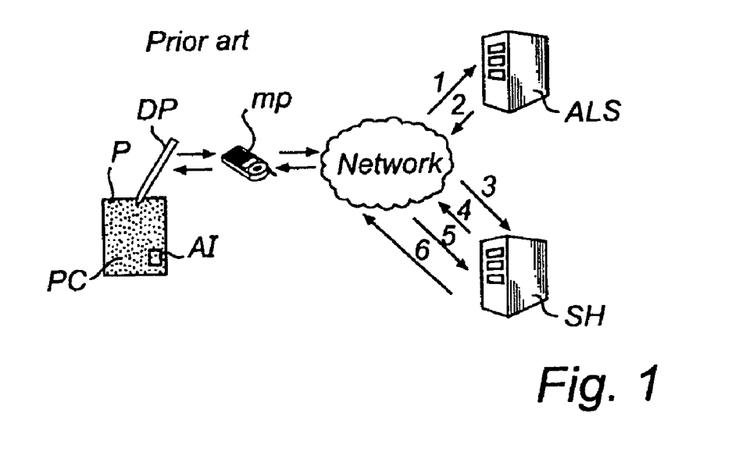
FIG. 1 shows a prior-art system for management and communication of information.

The above concept has been implemented in a system or infrastructure, which is shown in FIG. 1 and which is further disclosed in Applicant's international patent applications PCT/SE00/02640, PCT/SE00/02641, and PCT/SE00/02659 which are incorporated herein by this reference. The system of FIG. 1 comprises a plurality of digital pens DP, a plurality of products P with a position code PC, a lock-up unit ALS, and a plurality of service handler units SH. The look-up unit ALS comprises one or more computer servers that communicate with a database containing the virtual space and information related thereto. For example, the database could associate one or more positions in the virtual space with a network address to a particular service handler unit SH. The service handler unit SH is a server unit effecting a service, such as storing or relaying digital information, or initiating transmission of information or items to a recipient.

When the digital pen DP is operated to mark an activation icon AI on the position-coded product P, the pen DP initiates an operation to forward a message to the look-up unit (step 1), for example via short-range radio transmission to a mobile phone MP acting as a modem for connection to the look-up unit ALS. The message contains a unique pen identifier and at least one position from the digital information that has been recorded electronically on the writing surface of the product P. Based on the position content of the message, the look-up unit ALS instructs the digital pen DP to contact a specific service handler unit SH at the above-mentioned network address (step 2). The pen DP then sends the message to the service handler unit SH (step 3), which instructs the pen DP on what data to send, and how to format and tag that data (step 4). After having received the requested data from the pen DP (step 5), the service handler unit SH returns a verification thereof to the pen DP (step 6).

The information management system of FIG. 1 involves many inter-reliant actors: companies manufacturing the digital pens ("pen manufacturers"), companies manufacturing the position-coded products ("paper manufacturers"), companies providing different services by means of the service handler units ("service handlers"), a company administrating the position-code based on the virtual space database ("pattern administrator"), operators providing the communication link between the digital pens and the different units ("network operators"), and a multitude of users of digital pens ("pen owners").

One major problem that remains to be solved is how to coordinate the different actors in the system in a simple and efficient way.

SUMMARY OF THE INVENTION

It is an object of the present invention to provide a solution to, or at least mitigate, the above-mentioned problem.

This object is achieved according to the invention by an information management system, a host unit, and methods as set forth in the claims. Preferred embodiments are defined by the dependent claims.

BRIEF DESCRIPTION OF THE DRAWINGS

Preferred embodiments of the invention will be described in more detail below with reference to the accompanying drawings.

DESCRIPTION OF PREFERRED EMBODIMENTS

In the following, the inventive system will be described with reference to the embodiment shown in FIGS. 2-3. After this general presentation of the system structure and the flow of data therein, the structure of the interface to the databases of the system will be further described with reference to FIGS. 4-7. Then, examples of how different actors can access the system will be illustrated with reference to FIGS. 8-11.

Figure 2:
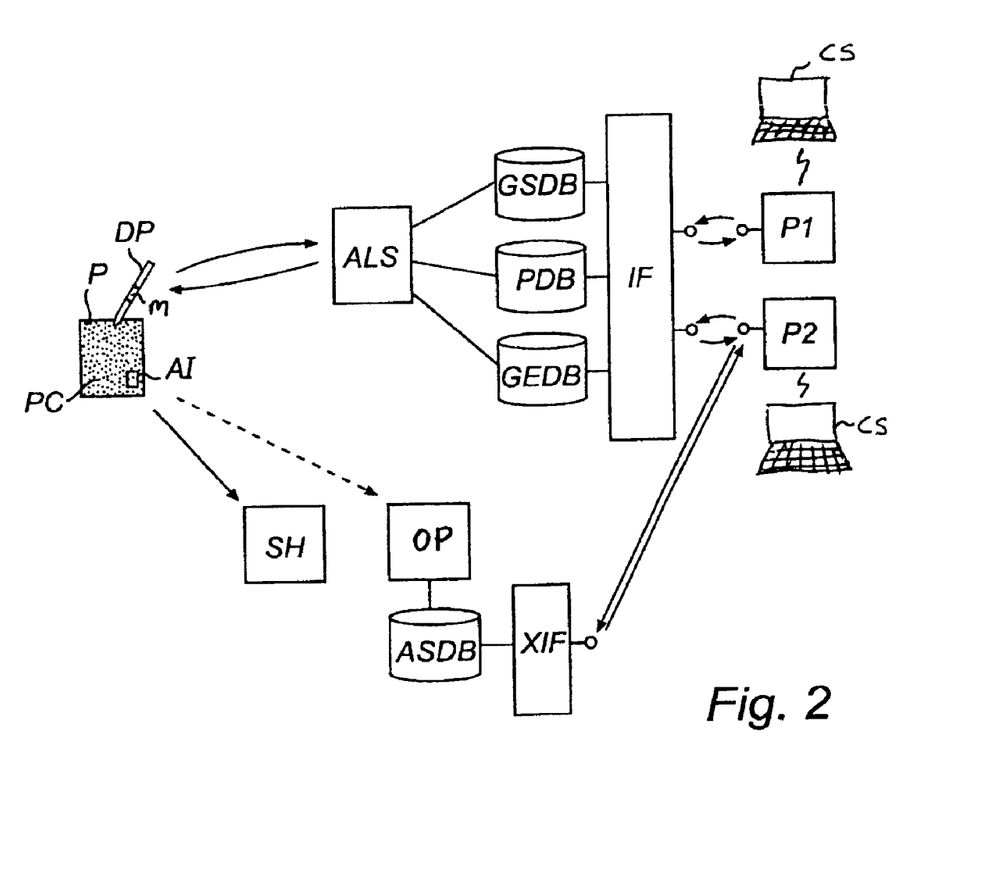
FIG. 2 shows an embodiment of a system for management and communication of information including an interface unit according to the present invention.

The system of FIG. 2 includes a multitude of digital pens DP and position-coded products P (only one of each shown in FIG. 2), a look-up unit ALS, and a plurality of service handler units SH (only one shown in FIG. 2). The configuration and interrelation of the different parts of the system, as well as the communication of information between these parts, have already been described above and will therefore not be repeated here.

It should be noted, however, that the information can be transmitted in any suitable way from the digital pen DP to the look-up unit ALS and the service handler units SH. In one embodiment, wireless transmission of information is effected from the digital pen DP to a network connection unit, which in turn transmits the information to the look-up unit ALS and service handler units SH, respectively. The network connection unit can be the mobile phone MP shown in FIG. 1, or a PDA, a computer or any other suitable unit with an interface to a computer network such as the Internet or a LAN. Alternatively, the network connection unit can be an integral part of the digital pen DP.

The look-up unit ALS is connected to a virtual space database GSDE which includes data on the actor associated with each position which is coded, directly or indirectly, by the position code PC. Direct coding implies that the actual positions coded by the position code PC are communicated to the units in the system. Indirect coding implies that the actual positions coded by the position code PC are transformed before being communicated from the digital pen DP to the units of the system. For example, only a subset of the data representing each actual position may be communicated. In ore such embodiment, the actual positions are grouped in the database GSDP into regions of standard size, so that each actual position can be transformed into a region identifier, which identifies the associated region, and a local position within this region. The region could be a digital page that corresponds to the position-coded product P. Thus, the amount of data transmitted from the digital pens DP is reduced, since the region identifier only needs to be transmitted occasionally, typically when the actual positions change from one region to another, and since the local positions can be represented in a more compact form than the actual positions. A more detailed example is found in the above-mentioned PCT/SE00/02640.

The virtual space database GSDB may also store data on the functionality of the positions coded by the position code PC, although such data might instead, or in addition, be stored in the respective service handler units SH.

The look-up unit ALS is also connected to a pen database PDB, which includes data on all digital pens in the system, such as a unique pen identifier of each pen and all settings or properties that are associated with each pen. The pen database PDB also includes data on the manufacturer of each pen. In addition thereto, the look-up unit ALS is connected to an event database GEDB, which includes data on the transactions taking place in the look-up unit ALS, i.e the address requests made by the pens in the system and the address responses returned to the pens, as well as any errors occurring in the process.

As an alternative to individual databases as shown in FIG. 2, the look-up unit ALS could instead be connected to one all-embracing database, or each individual database could be distributed over more than one physical unit.

The system also includes one or more networks in which network operators handle the communication between the digital pens DP and the look-up unit ALS, and between the digital pens DP and the service handler units SH. To this end, the owner of a pen has opened a subscription at one of the network operators. This network operator could also act as a service handler in the system, for example by means of a server unit OP providing communication services that allows the pen owner to send electronic messages, for example e-mail, SMS or fax, based on information written on the position-coded products P by means of the digital pen DP. The server unit OP of the network operator could also provide for network storage of information generated in the system, for example entries in an position-coded calendar or notebook. When acting as a service handler, the network operator maintains an application database ASDB which contains data on user-specific settings for different applications, for example a signature or electronic business card to be attached to e-mail messages, where and how to store sent messages, etc.

The actors in the system disclosed in FIG. 2 include pen owners, pen manufacturers, paper manufacturers, service handlers, network operators, and a pattern administrator.

In the embodiment of FIG. 2, the system includes two Internet portals P1, P2 hosted by one or more web servers which are interfaced to the databases of the system. One portal P1 is a so-called Partner Portal, i.e. a portal which allows pen manufacturers, paper manufacturers, pattern administrators, service handlers and network operators to access selected portions of the databases of the system. The other portal P2 is a so-called Pen Owner Portal, i.e. a portal which allows the pen owners to access selected portions of the databases in the system. In an alternative embodiment, the functionality of the two portals is merged into one general portal.

Figure 3:
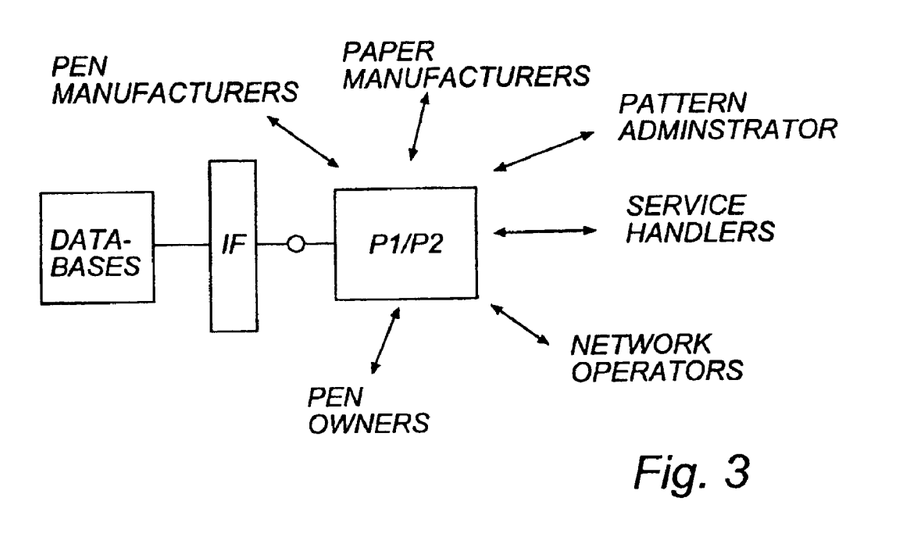
FIG. 3 illustrates how the present invention allows different actors to enter data into and retrieve data from the system of FIG. 2.

FIGS. 2-3 show that an interface unit IF connects the portals P1, P2 to the databases of the look-up unit ALS. The interface unit IF, which is described in more detail below, handles the low-level accesses to the databases GSDB, GEDB, PDB in the system. The portal P2 could be connected to external databases, such as the application database ASDB of the network operator, by means of an external interface unit XIF of similar design.

The above Internet portals P1, P2 are implemented on one or more Internet-connected servers providing a graphical user interface (GUI) to the actors via the Internet. It should be noted, however, that Internet is representative of a preferred use of the present invention, but should not be considered limiting, as the invention could apply in other networks and combinations of networks.

As indicated in FIG. 2, the actors in the system can access the portals P1, P2 by means of a web browser on any suitable client station CS, such as a personal computer, a PDA, a mobile phone etc.

From FIG. 3, which illustrates the interaction of the actors with the system, it is clear that the Internet portals P1, P2, by means of the interface unit IF, act a hub in the inventive system. Thus, the interface unit IF provides an auxiliary communication path to the databases GSDB, PDB, GEDB, ASDB of the system, beside the communication path that is set up between each digital pen and the look-up unit and its databases GSDB, PDB, GEDB.

By means of the interface unit IF, via the portal P1, pen manufacturers are able to retrieve lists of unique pen identifiers to be entered into the hardware or software of the digital pens as they are manufactured. As already mentioned, such pen identifiers are stored in the pen database PDB. As an additional advantage, the interface unit IF allows for the use of public key encryption in the system, in that the pen manufacturers easily can transfer a public encryption key for each digital pen DP to the pen database PDB, and retrieve a public encryption key for the look-up unit ALS for storage in the digital pens. Further security data, such as a pen-specific PIN code, could be transferred to the pen database PDS together with the public encryption key.

Further, paper and product manufacturers are able to retrieve portions of the virtual space to be put on the product. For example, a notebook manufacturer can license a section of the virtual space, retrieve the corresponding position-code, or an algorithm for calculating the same, split the licensed section into the desired number of page-sized position code areas, and print the position code areas on the physical pages of a notebook. Further, paper and product manufacturers are able to enter or change properties in the virtual space database GSDB, such as the network address of the service handler unit SH to which the look-up unit ALS should direct the pen, an expiry date of this address, encryption settings, etc. Alternatively, the pattern administrator can access the virtual space database on behalf of the paper and product manufacturers.

Like the paper and product manufacturers, service handlers such as companies promoting and/or selling a service or an item via a position-coded product, could retrieve a position-code through the Internet portal, for use on an advertisement, an order form, or the like. Service handlers may also be able to enter or change settings in the virtual space database GSDB.

By means of the interface unit IF, via the portal P1, network operators are, for example, able to register a new subscription in the pen database PDB, and to lock a specific digital pen in the pen database PDB to block the pen from the look-up unit ALS in the system. The network operators could also be allowed to search the event database GEDB for trouble shooting purposes.

By means of the interface unit IF, via the portal P2, pen owners are able to view, change and/or add settings related to their digital pen. These settings are stored in the pen database PDB and/or in the application database ASDB. The settings in the pen database PDB can include personal data such as name, postal address, delivery address, e-mail address, home phone number, mobile phone number, home fax number, business fax number, business phone number, credit card number etc. The settings in the pen database PDB can also relate to feedback, for example to what extent the pen user should be prompted for confirmation before anything is sent from the pen. It is also conceivable to let the pen owner set up a filter that specifies the personal data that can be requested by different service handler units SH. Further, the user-controllable settings in the pen database PDB can relate to the operation of the pen, for example the degree of data compression in the pen, the maximum residence time in the pen for registered information, any pen-specific PIN code used in authentication of the pen etc. The data in the application database ASDB can for example relate to a personal signature or an electronic business card to be attached to e-mail messages, a customized layout of fax massages, where and how to store sent messages, a default cc address for e-mail messages, etc. In case the pen owner has more than one pen, he is able to use an import/export function to copy settings between his different pen entries in the pen database.

By means of the interface unit IF, via the portal P2, pen owners are also able to lock their digital pens in the pen database PDB to block the pen from the look-up unit ALS in the system, for example when the digital pen is lost or stolen.

By means of the interface unit IF, via she portal P2, pen owners are also allowed to view events stored in the event database GEDB.

Further, by means of the external interface unit XIF, via the portal P2, pen owners can access other databases (not shown) of the network operator OP to view billing data, to view sent messages, to access a personal electronic calendar or notebook etc.

It should be noted that the portals P1, P2 can be hosted by any party, since any authorized server hosting a site on a public network, such as the Internet, is allowed to remotely connect to the interface unit IF. One such party is the pattern administrator who has the ultimate control over the look-up unit ALS and the databases GSDB, GEDB, PDB and who could provide the interface unit IF. Another such party could be one or more network operators, who could host a portal giving users access to operator databases as well as system databases.

It should also be realized that the portals P1, P2 can be designed based on knowledge common to the person skilled in the art, albeit with a customized GUI. The portals could also contain a database for web content management, as well as a membership database. The latter could include user account information, and store attributes for personalization of the web site, as well as data for accessing the interface unit.

One advantageous aspect of the system shown in FIGS. 2-3 is that the pen owner is able to store, add and change personal data in the system. Instead of requiring the pen owner to enter personal data each time he uses the combination of pen and a position-coded product, for example to write personal data in dedicated OCR fields on the product or to provide personal data in interaction with the network connection unit (MP in FIG. 1), personal data can be supplied within the system to the service handler unit SH, either automatically or on demand. This allows for an intuitive and streamlined use of the digital pen, in that the digital pen can be used like a regular pen, with the functionality being embedded in the position-coded product surface. Further, the risk or typing/recognition errors is minimized by the use of predetermined settings in the system.

In one embodiment, at least part of the settings in the pen database PDB are also stored in an internal memory M (FIG. 2) at the digital pen. One advantage of this approach is that these settings can be directly used in interaction with the pen owner, for example in a process of requesting confirmation, typically via a display on the network connection unit (MP in FIG. 1). Such interaction can be essentially instant, since the pen does not need to retrieve the settings from the distant pen database PDB. Further, staring pen settings in the pen itself will reduce both the load on the look-up unit ALS and the amount of data that is transferred in the system network, since the settings can be directly transferred from the pen DP to a service handler unit SH whenever necessary.

The provision of an interface unit IF allows a pen owner to access the pen database PDS via a public web site, such as the Internet portal discussed above. For example, by integrating a browser (WAP, i-mode etc) in the mobile phone, PDA or personal computer that connects the pen to the network, the pen owner is given the possibility to change his pen settings at any time.

Preferably, the system is arranged to sense any changes in the pen database PDB, and to send any updated or new settings to the pen the next time it connects to the look-up unit PLS. Since the pen settings are updated through the interface unit IF, synchronization conflicts are avoided.

In the following, an overview or a portal platform is presented with reference to FIG. 4, with a brief description of the included elements. Then, in conjunction to FIGS. 5 and 6, the structure and function of the included elements are described in some more detail.

Figure 4:
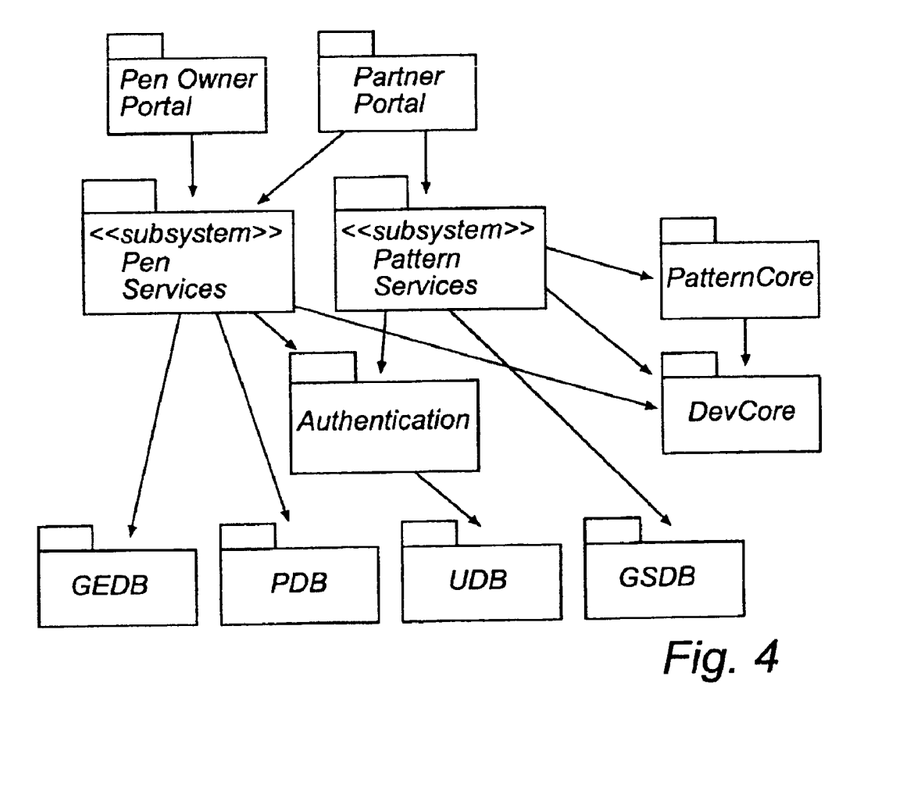
FIG. 4 shows an overview of the portal platform in the system of FIG. 2.

FIG. 4 illustrates the logical composition of the portal platform, the elements of which are arranged in three major layers.

The outermost layer is a portal layer, which provides a GUI and includes elements that interact with the actors in the system. This layer includes the Pen Owner Portal and the Partner Portal. The Partner Portal is used both by persons that administer internal functions like managing the system databases, and partners that administer functions related to their business, wherein the different roles in the authentication (to be described below) determine which functions are available. The Pen Owner Portal is used by the pen owners to manage their pen settings.

The intermediate layer is an interface layer, which forms the interface unit and provides interfaces to the internal system databases GSDB, PDB, GEDB. The interfaces are exposed under access control, so only the needed interfaces are available for a calling application. There are two elements in the interface layer, namely a Pen Services element and a Pattern Services element.

The inner layer is a database layer which encapsulates the data sources of the look-up unit ALS, which in this case includes the virtual space database GSDB, the pen database PDB, the event database GEDB and a user database UDB. The user database UDB contains data on accounts (login/password) and connected roles and privileges. The user database UDB is accessed in the handling of authentication and access rights to the data structures in the databases.

Outside these layers, the platform further includes one package (DevCore) that contains common functions that are used by all interface layer elements, and another package (PatternCore) that encapsulates logic for position code generation and management.

The Pen Services element is designed to allow for management of user settings for a pen, management of system settings for a pen and registration of pens. The Pattern Services element is designed to allow for registration of paper application services, and for management of paper application service properties, such as where to route data, expiry date, encryption, etc.

The interface layer elements are accessed using a standard http(s) protocol, and each request to the interface elements returns a http(s) response including an XML document.

The responsibility of each interface layer element is to validate a received request (types, ranges), to determine access rights of the requesting user/system, to locate a proper database, to retrieve data therefrom, to transform the retrieved data into an XML document as defined by an interface specification of the interface layer element, and to return the XML document to the requesting user/system. The databases are reached from the interface layer with the use of IIOP and Corba.

Figure 5:
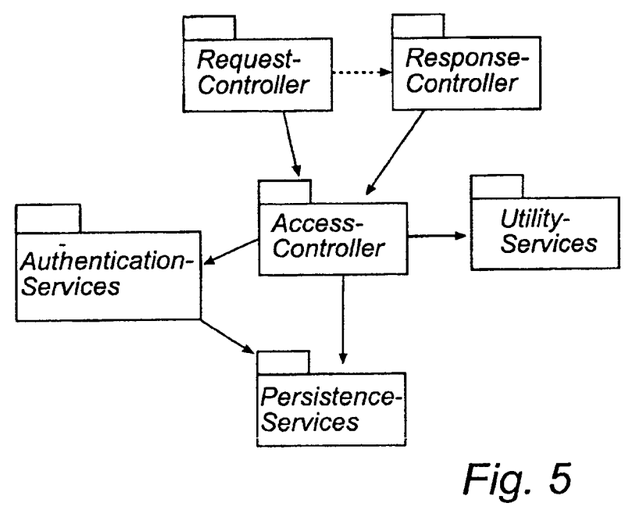
FIGS. 5 and 6 show the structure of the interface unit in greater detail.

FIG. 5 illustrates the architecture of the interface layer elements. The architecture defines a number of packages: RequestControllers (Servlets) which handle incoming http requests and validate interface access rights; ResponseControllers (JSPs) which produce the response content; AccessControllers (Java classes) which encapsulate internal program logic and flow, map database resources, and apply access rights; UtilityServices (Java classes) which are responsible for helper utility classes, object abstractions of data entities, parsers; PersistenceServices which wrap Corba accesses and locate database instances; and AuthenticationServices which manage fine-grained access rights to resources. Examples of the above-mentioned UtilityServices are the PatternCore and Corba helper classes.

The AuthenticationServices package encapsulates the authentication needed by the interface layer elements. The responsibility of the package is to represent all access rights (roles and privileges) that an authenticated user or system has been granted. All information needed for access restrictions is supplied from this package. The other packages can use that information to filter out correct data before passing it along.

The PersistenceServices package encapsulates the actual Java-Corba mapping for remote access to Corba interfaces of the databases, the interfaces being written in IDL. The server-side parts of the persistence services are located in Oracles databases, implemented as java code using JDBC to access the tables.

Figure 6:
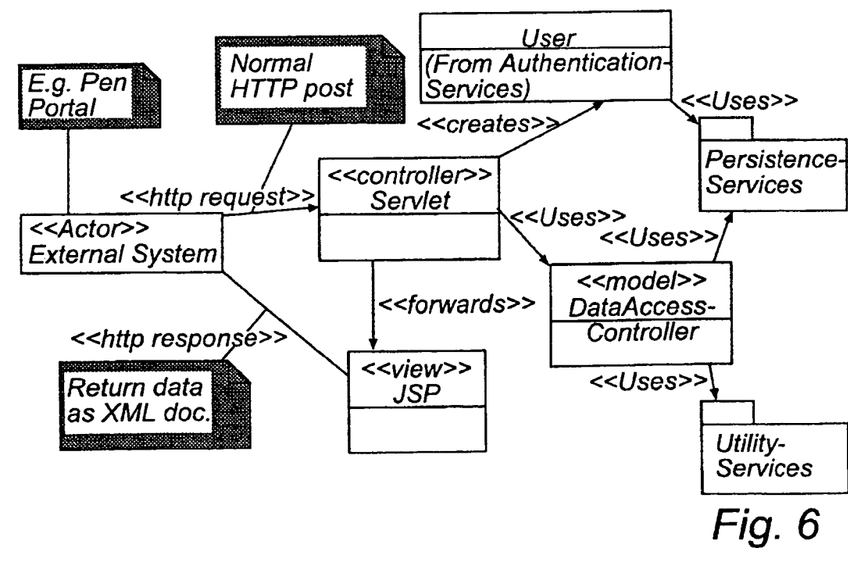

All elements inside the interface layer follow a common design pattern, as shown in FIG. 6. A controller Servlet listens to incoming http requests. The Servlet instantiates a java class, acting as a facade controller for the application logic. The facade object uses several internal java objects to accomplish the business rules for retrieving and storing data from the PersistenceServices package. Eventually, the controller Servlet determines from the facade controller what kind of result that shall be returned to the caller, and forwards the http request to the proper view JSP page. This JSP page uses information sent to the Servlet from the facade controller and produces an XML document, which is returned to the caller.

This design pattern has the advantages of separating presentation and application logic, and of encapsulating logic inside java components.

Figure 7:
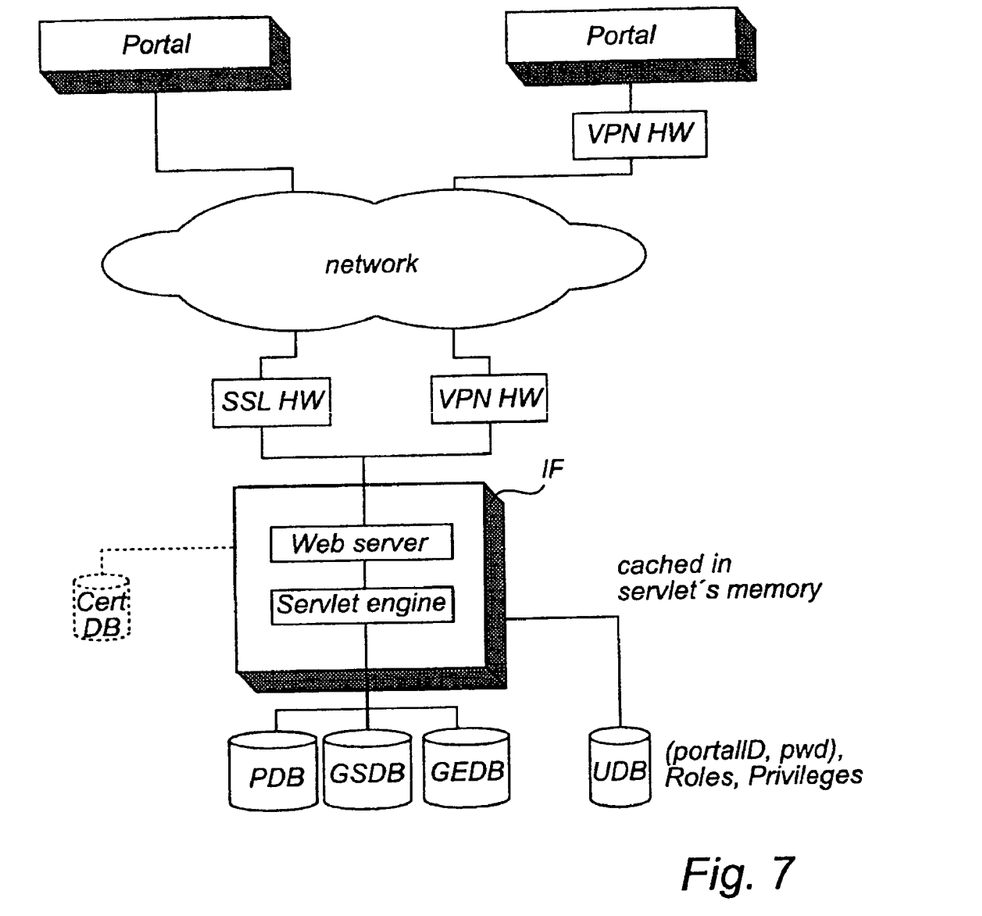
FIG. 7 shows two examples of communication links between the portal and the interface unit.

FIG. 7 illustrates security issues for connecting the portal to the interface unit IS at present, two ways of connecting the portal to the interface unit IF are contemplated. Either a VPN (Virtual Private Network) is set up (shown on the right-hand side of FIG. 7), or the portal is connected over the Internet using SSL (shown on the left-hand side of FIG. 7). In both embodiments, an encrypted communication link is established between the portal and the interface unit IF. Since encryption is very CPU intensive, hardware devices could terminate the SSL or VPN link instead of the web servers. If the portal is connected to the interface unit via VPN, then VPN hardware could be used at both ends. If SSL is used, no extra hardware would be needed, but recommended, at the portal side. The web servers will always receive normal http requests from the portals.

With every request that a portal sends to the interface unit, a portal-ID and a password may be attached. These are received by the servlets, which may consult the UDB to authenticate the portal. If the portal is authenticated, appropriate roles and privileges to the interface layer elements may be determined. As an option, all portals could be required to submit a client certificate with the requests to the web server to authenticate the portal.

The operation of the portal will now be described by reference to exemplifying user scenarios.

Figure 8:
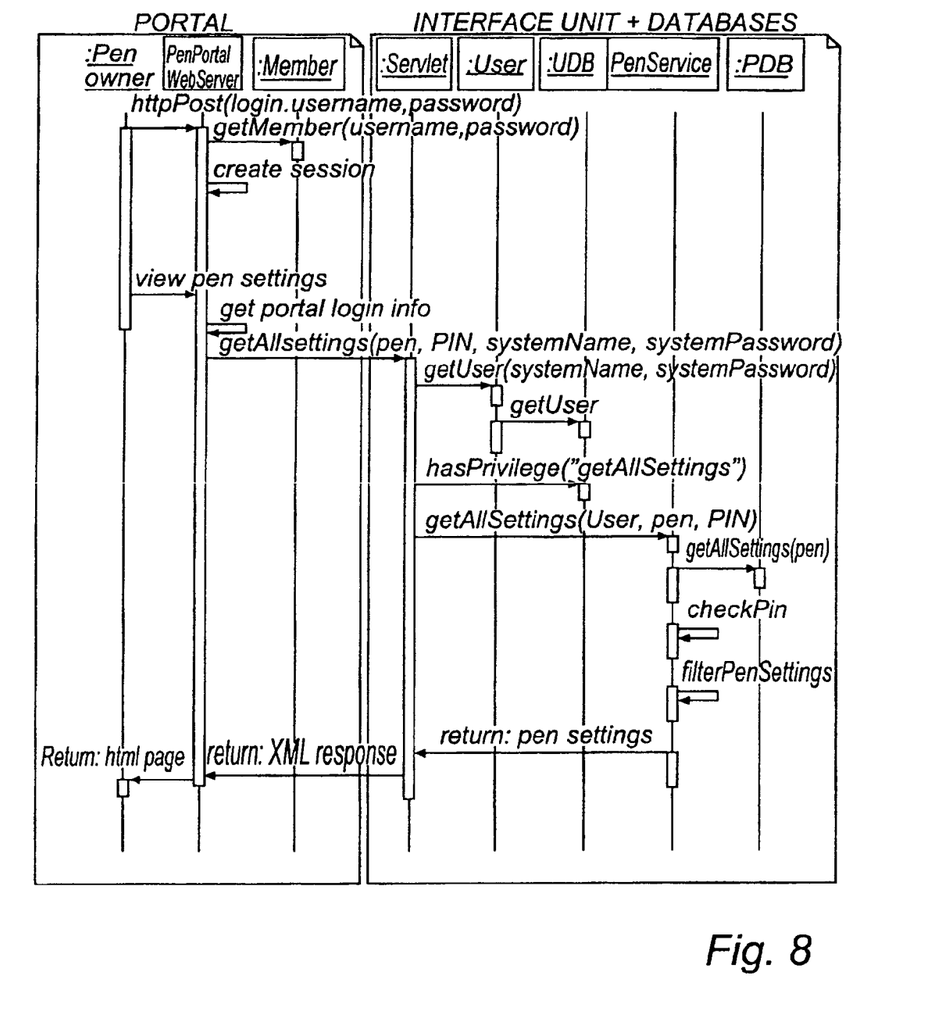
FIGS. 8-11 illustrate the flows of data within the system for different user scenarios.

In a first scenario, illustrated in FIG. 8, a pen owner uses a Pen Owner Portal to view the current pen settings. Here, it is assumed that the Pen Owner Portal is implemented in a servlet/JSP-enabled web server. The pen owner logs in to the Pen Owner Portal by submitting his username and password from the login web page. The username and password are encrypted with SSL. The Pen Owner Portal validates the pen owner with a member package. If the user is authenticated, the Pen Owner Portal starts a web session with the pen owner, by using a servlet session. The Pen Owner Portal displays a welcome page with a list of available functions. The pen owner is now logged in to the portal. Then, the pen owner selects the View Pen Settings function. The Pen Owner Portal retrieves, from the member package, the codes (pen identifier and PIN code) associated with the user. Then, the Pen Owner Portal makes an HTTP request to the Pen Services element of the interface unit, submitting the pen identifier and the PIN code. The Pen Owner Portal also submits its own login info (systemname and system-Password) for authentication to the Pen Services element. The Pen Services element is implemented as an HttpServlet in a servlet/JSP-enabled web server. First, the Pen Services element consults the Authentication package to authenticate the calling system and determine the role it will have. This is done with the User and UDB classes. In this case, the role gives the Pen Owner Portal access rights to the pen settings interface, and has the privilege to perform the operation "get all settings". The Pen Services element retrieves the pen information from the pen database PDB. It compares the retrieved PIN code with the one submitted in the request by the portal. In the case of mismatch, no pen settings are returned to the portal. Otherwise, the Pen Services element filters cut properties and returns only those settings to which the system has access rights (as determined by the User object). The Pen Services element returns the settings list to the servlet. The servlet constructs an XML document from those settings, and this document is sent as the response to the Pen Owner Portal. The Pen Owner Portal transforms the XML document into an HTML page suitable for a user to view. The HTML page is returned to the pen owners web browser.

Figure 9:
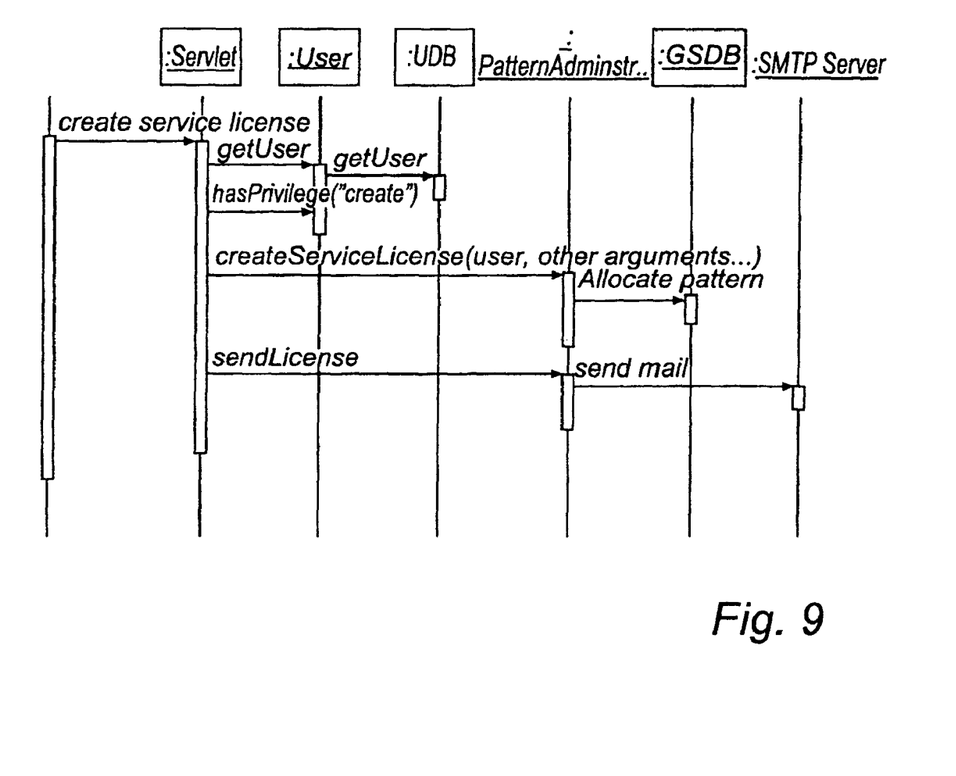

In a second scenario, illustrated in FIG. 9, a pattern administrator creates a new position code license via the Partner Portal. The pattern administrator starts with a standard login procedure. The servlet uses the Authentication package to determine that the user has privileges to create service licenses. A request for a section of the virtual space is submitted by the user, for example by specifying a desired section size. Based on this request, the license is created, by a corresponding section of positions being allocated by the servlet in the virtual space database GSDB. Either before or after the allocation, the servlet may send an offer to the user indicating the allocated section. Upon receipt of an acceptance to the offer, the servlet sends a license file to the licensee. The license file may, inter alia, include the position-code corresponding to the allocated section, or an algorithm for calculating the same. In an analogous procedure, a paper or product manufacturer or a service handler can create a service license by accessing the interface unit by logging in to the Partner Portal.

Although not shown in FIG. 9, the second scenario may also allow for registration of a network address with the system. Here, the network address is submitted to the servlet, which stores the network address in the virtual space database GSDB in association with the allocated section. The network address identifies the service handler unit SH to which a requesting digital pen is to be directed by the server means ALS upon receipt of a position within the allocated section.

It is also conceivable that the interface unit IF is accessed directly by an application design program run on a network computer at the paper/product manufacturer or at the service handler. The application design program allows the paper/product manufacturer or the service handler to design a position-coded product with a desired layout and embedded functionality Such an application design program is further disclosed in Applicant's international patent application No. PCT/SE01/01842, which is incorporated herein by this reference.

Figure 10:
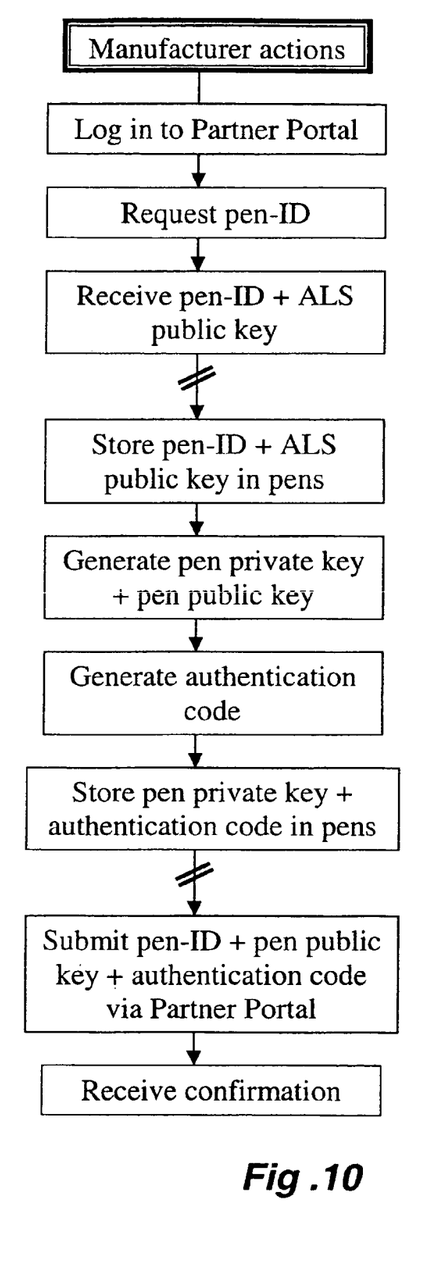
Figure 11:
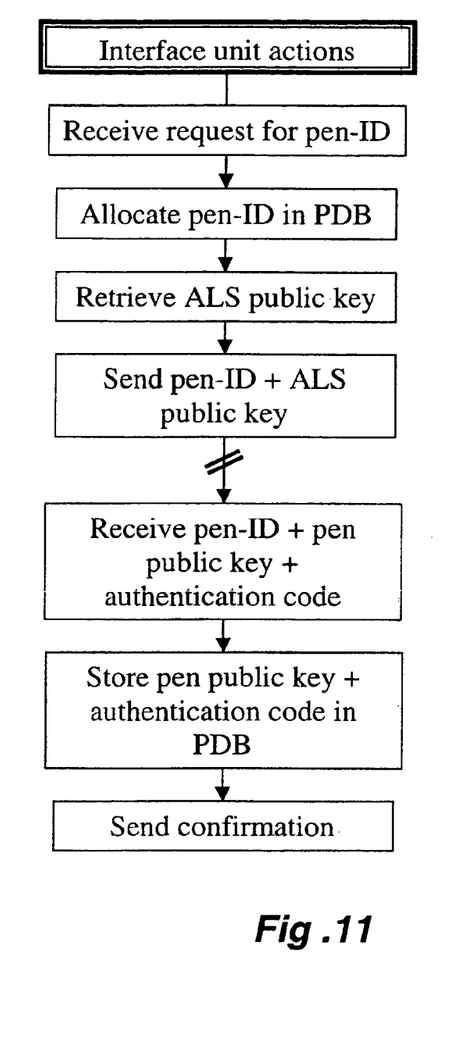

In a third scenario, schematically indicated in FIGS. 10 and 11, for actions taken on a manufacturer (client) side and in the interface unit, respectively, a pen manufacturer logs in to the Partner Portal and requests a series of pen identifiers (pen-ID) for pens to be manufactured. The interface unit IF allocates a series of pen identifiers to the pen manufacturer in the pen database PDB, and returns this series together with the public encryption key of the look-up unit ALS to the Partner Portal. In the production of pens, the pen manufacturer stores in the internal memory M of each pen a unique pen identifier taken from the pen identifier series, and the public encryption key of the look-up unit ALS. Further, a public encryption key and an authentication code, such as a PIN code or a password, are generated for each pen, and a private encryption key is generated and stored in the internal memory M of each pen together with the authentication code. When the pens have been produced, the pen manufacturer registers all qualified pens, by logging in to the Partner Portal and by submitting the pen identifiers, public encryption keys and authentication codes of the pens to the interface unit IF for storage in the pen database PDB. A confirmation message is then submitted to the pen manufacturer through the Partner Portal.

It should be noted that the third scenario is generally applicable to any type of handheld electronic unit which is to be registered for use in an information management system. It should also be realized that one or more of the above actions might be modified or omitted, or the actions may be effected in a different order.

As an alternative to submitting feedback data, such as the license file, the pen identifier series, and the confirmation message, to the user through the Partner Portal, such feedback data could be transmitted by other electronic means, such as e-mail, or be provided For electronic download, or be stored on a computer readable medium and transmitted by regular mail.

The foregoing description of an implementation of the invention has been presented for the purposes of illustration and description. It is not exhaustive and does not limit the invention to the precise form disclosed. Modifications and variations are possible in light of the above teachings or may be acquired from practicing the invention.

The invention claimed is:

1. An information management system comprising:
a product provided with a position code;
a digital pen capable of reading the position code;

a look-up unit communicating with the digital pen via a first communication path, wherein the look-up unit includes an identifier corresponding to the digital pen;

a plurality of databases including:

a pen database storing a setting corresponding to the digital pen, wherein the pen database is configured to communicate with the digital pen via the first communication path and by using the identifier;

a position database storing position data which associates said position code with rules for information management, wherein the digital pen communicates a region identifier to the position database by using the look-up unit to access the position database via the first communication path, the region identifier identifying a region including at least one position which is coded by the position code and including a local position corresponding to a location of the one position in the region; and an event database storing event data tracking a transaction performed by using the look-up unit in association with the digital pen, the event database configured to store error information when an error is caused during the transaction; and an interface unit, separate from the look-up unit, and used to provide access to the pen database, the position database, and the event database via a second communication path that is separate from the first communication path, wherein a user of the digital pen or an additional entity changes the setting by using the interface unit to access the pen database via the second communication path, wherein the user or the additional entity retrieves the position data by using the interface unit to access the position database via the second communication path, and wherein the user or the additional entity views the event data by using the interface unit to access the event database via the second communication path.

2. A system according to claim 1, wherein the interface unit is arranged for connection to a host unit providing a graphical user interface.

3. A system according to claim 2, wherein the host unit is a web server.

4. A system according to claim 1, wherein the interface unit is arranged for connection to a host unit providing a site on a public network.

5. A system according to claim 1, wherein the interface unit is connected to the position database via the second communication path.

6. A system according to claim 5, wherein the interface unit allows actors that provide the position code on the product to allocate, in the position database, one or more positions for specific information management.

7. A system according to claim 6, wherein the actors include the additional entity or a service handler that receive information registered with the digital pen.

8. A system according to claim 1, wherein the additional entity includes a manufacturer of the product.

9. A system according to claim 1, wherein the interface unit allows the additional entity to associate said position data with a network address.

10. A system according to claim 1, wherein the interface unit allows an owner of the digital pen to access at least part of said transaction data in the event database.

11. A system according to claim 1, wherein the identifier is unique to the digital pen, and wherein the interface unit is connected to the pen database.

12. A system according to claim 1, wherein the interface unit allows a manufacturer of the digital pen to register said identifier in the pen database.

13. A system according to claim 1, wherein the digital pen is locked by changing the setting.

14. A system according to claim 1, wherein the setting of the digital pen is changed to block communication between the look-up unit and the digital pen.

15. A system according to claim 1, wherein the pen database associates a public encryption key with the digital pen, and wherein the interface unit allows a manufacturer of the digital pen to store said public encryption key in the pen database.

16. A system according to claim 1, further comprising a host unit which is arranged for communication with the interface unit, said host unit providing a site on a public network.

17. A system according to claim 16, wherein the host unit arranged for communication with at least one operator database of at least one operator of a communication network.

18. A system according to claim 17, wherein an owner of the digital pen accesses transaction data from said at least one operator database, said transaction data relating to communication to and from the digital pen in the system.

19. A system according to claim 17, wherein an owner of the digital stores or changes individual application settings in said at least one operator database.

20. An information management system comprising:

a product provided with a position code;

a digital pen capable of reading the position code;

a look-up unit communicating with the digital pen via a first communication path, wherein the look-up unit includes an identifier corresponding to the digital pen;

a plurality of databases including:

a pen database storing a setting corresponding to the digital pen, wherein the pen database is configured to communicate with the digital pen via the first communication path and by using the identifier;

a position database storing position data which associates said position code with rules for information management, wherein the digital pen communicates a region identifier to the position database by using the look-up unit to access the position database via the first communication path, the region identifier identifying a region including at least one position which is coded by the position code and including a local position corresponding to a location of the one position in the region;

an event database storing event data tracking a transaction performed by using the look-up unit in association with the digital pen, the event database configured to store error information when an error is caused during the transaction; and an application database storing user-specific data of an application program associated with the digital pen; and an interface unit, separate from the look-up unit, and used to provide access to the pen database, the position database, and the event database via a second communication path that is separate from the first communication path, wherein a user of the digital pen or an additional entity changes the setting by using the interface unit to access the pen database via the second communication path, wherein the user or the additional entity retrieves the position data by using the interface unit to access the position database via the second communication path, and wherein the user or the additional entity views the event data by using the interface unit to access the event database via second communication path.

21. An information management system comprising:
a product provided with a position code;
a digital pen capable of reading the position code;
a look-up unit communicating with the digital pen via a first communication path, wherein the look-up unit includes an identifier corresponding to the digital pen;
a plurality of databases including:
   a pen database storing a setting corresponding to the digital pen, wherein the pen database is configured to communicate with the digital pen via the first communication path and by using the identifier;
   a position database storing position data which associates said position code with rules for information management, wherein the digital pen communicates a region identifier to the position database by using the look-up unit to access the position database via the first communication path, the region identifier identifying a region including at least one position which is coded by the position code and including a local position corresponding to a location of the one position in the region;
   an event database storing event data tracking a transaction performed by using the look-up unit in association with the digital pen, the event database configured to store error information when an error is caused during the transaction; and
   an application database storing user-specific data of an application program associated with the digital pen;
an interface unit, separate from the look-up unit, and used to provide access to the pen database, the position database, and the event database via a second communication path that is separate from the first communication path; and
an external interface unit, separate from the interface unit, and used to provide access to the application database,
wherein a user of the digital pen or an additional entity changes the setting by using the interface unit to access the pen database via the second communication path,
wherein the user or the additional entity retrieves the position data by using the interface unit to access the position database via the second communication path, and
wherein the user or the additional entity views the event data by using the interface unit to access the event database via second communication path.

22. An information management system comprising:
a product provided with a position code;
a digital pen capable of reading the position code;
a look-up unit communicating with the digital pen via a first communication path, wherein the look-up unit includes an identifier corresponding to the digital pen;
a plurality of databases including:
   a pen database storing a setting corresponding to the digital pen, wherein the pen database is configured to communicate with the digital pen via the first communication path and by using the identifier;
   a position database storing position data which associates said position code with rules for information management, wherein the digital pen communicates a region identifier to the position database by using the look-up unit to access the position database via the first communication path, the region identifier identifying a region including at least one position which is coded by the position code and including a local position corresponding to a location of the one position in the region;
   an event database storing event data tracking a transaction performed by using the look-up unit in association with the digital pen, the event database configured to store error information when an error is caused during the transaction; and
   an application database storing user-specific data of an application program associated with the digital pen;
an interface unit, separate from the look-up unit, and used to provide access to the pen database, the position database, and the event database via a second communication path that is separate from the first communication path; and
a server unit configured to send an electronic message based on information written on the product by the digital pen,
wherein a user of the digital pen or an additional entity changes the setting by using the interface unit to access the pen database via the second communication path,
wherein the user or the additional entity retrieves the position data by using the interface unit to access the position database via the second communication path, and
wherein the user or the additional entity views the event data by using the interface unit to access the event database via second communication path.

23. A system according to claim 22, wherein the user-specific data includes information corresponding the user of the digital pen, and the information is included in the electronic message.

24. An information management system comprising:
a product provided with a position code;
a digital pen capable of reading the position code;
a look-up unit communicating with the digital pen via a first communication path, wherein the look-up unit includes an identifier corresponding to the digital pen;
a plurality of databases including:
   a pen database storing a setting corresponding to the digital pen, wherein the pen database is configured to communicate with the digital pen via the first communication path and by using the identifier;
   a position database storing position data which associates said position code with rules for information management, wherein the digital pen communicates a region identifier to the position database by using the look-up unit to access the position database via the first communication path, the region identifier identifying a region including at least one position which is coded by the position code and including a local position corresponding to a location of the one position in the region; and
   an event database storing event data tracking a transaction performed by using the look-up unit in association with the digital pen, the event database configured to store error information when an error is caused during the transaction;
an interface unit, separate from the look-up unit, and used to provide access to the pen database, the position database, and the event database via a second communication path that is separate from the first communication path; and
a server unit configured to send an electronic message based on information written on the product by the digital pen, wherein a user of the digital pen or an additional entity changes the setting by using the interface unit to access the pen database via the second communication path, wherein the user or the additional entity retrieves the position data by using the interface unit to access the position database via the second communication path, and wherein the user or the additional entity views the event data by using the interface unit to access the event database via second communication path.

25. An information management system comprising:
a product provided with a position code;
a digital pen capable of reading the position code;
a look-up unit communicating with the digital pen via a first communication path, wherein the look-up unit includes an identifier corresponding to the digital pen;
a plurality of databases including:
  a pen database storing a setting corresponding to the digital pen, wherein the pen database is configured to communicate with the digital pen via the first communication path and by using the identifier;
  a position database storing position data which associates said position code with rules for information management, wherein the digital pen communicates a region identifier to the position database by using the look-up unit to access the position database via the first communication path, the region identifier identifying a region including at least one position which is coded by the position code and including a local position corresponding to a location of the one position in the region;
  an event database storing event data tracking a transaction performed by using the look-up unit in association with the digital pen, the event database configured to store error information when an error is caused during the transaction; and
  an application database storing user-specific data of an application program associated with the digital pen;
an interface unit, separate from the look-up unit, and used to provide access to the pen database, the position database, and the event database via a second communication path that is separate from the first communication path;
an external interface unit, separate from the interface unit, and used to provide access to the application database; and
a server unit configured to send an electronic message based on information written on the product by the digital pen,
wherein the user-specific data includes information corresponding the user of the digital pen, and the information is included in the electronic message,
wherein a user of the digital pen or an additional entity changes the setting by using the interface unit to access the pen database via the second communication path,
wherein the user or the additional entity retrieves the position data by using the interface unit to access the position database via the second communication path, and
wherein the user or the additional entity views the event data by using the interface unit to access the event database via second communication path.

26. A method of coordinating actors in an information management system including a product provided with a position code and a digital pen capable of reading the position code, the method comprising:
linking the digital pen and a look-up unit of the information management system via a first communication path;
providing an identifier corresponding to the digital pen to the look-up unit;
storing a setting corresponding to the digital pen in a pen database;
linking the digital pen and the pen database via the first communication path;
storing position data in a position database, the position data associating said position code with rules for information management;
sending, from the digital pen, a region identifier to the position database by using the look-up unit to access the position database via the first communication path, the region identifier identifying a region including at least one position which is coded by the position code and including a local position corresponding to a location of the one position in the region;
tracking a transaction performed by using the look-up unit in association with the digital pen by storing event data corresponding to the transaction in an event database;
storing error information in the event database when an error is caused during the transaction;
linking an interface unit, separate from the look-up unit, to the pen database, the position database, and the event database via a second communication path that is separate from the first communication path;
changing the setting by using the interface unit to access the pen database via the second communication path;
retrieving the position data by using the interface unit to access the position database via the second communication path; and
presenting the event data by using the interface unit to access the event database via second communication path.

27. A method according to claim 26, further comprising:
linking the interface unit with a host unit that provides a graphical user interface.

28. A method according to claim 26, further comprising:
linking the interface unit with a host unit that provides a site on a public network.

29. A method to claim 26, further comprising:
allocating one or more positions for specific information management in the position database.

30. A method to claim 26, wherein the actors include one of a service handler, a manufacturer of the product, or a manufacturer of the digital pen.

31. A method to claim 26, further comprising:
associating said position data with a network address.

32. A method to claim 26, further comprising:
enabling a subscription service corresponding to the digital pen.

33. A method to claim 26, further comprising:
locking the digital pen by changing the setting.

34. A method to claim 26, further comprising:
blocking communication between the look-up unit and the digital pen by changing the setting.

35. A method according to claim 26, further comprising:
associating a public encryption key with the digital pen; and
storing the public encryption key in the pen database.

36. A method of coordinating actors in an information management system including a product provided with a position code and a digital pen capable of reading the position code, the method comprising:
linking the digital pen and a look-up unit of the information management system via a first communication path;
providing an identifier corresponding to the digital pen to the look-up unit;

storing a setting corresponding to the digital pen in a pen database;

linking the digital pen and the pen database via the first communication path; storing position data in a position database, the position data associating said position code with rules for information management;

sending, from the digital pen, a region identifier to the position database by using the look-up unit to access the position database via the first communication path, the region identifier identifying a region including at least one position which is coded by the position code and including a local position corresponding to a location of the one position in the region;

tracking a transaction performed by using the look-up unit in association with the digital pen by storing event data corresponding to the transaction in an event database;

storing error information in the event database when an error is caused during the transaction;

storing, in an application database, user-specific data of an application program associated with the digital pen;

linking an interface unit, separate from the look-up unit, to the pen database, the position database, and the event database via a second communication path that is separate from the first communication path;

changing the setting by using the interface unit to access the pen database via the second communication path;

retrieving the position data by using the interface unit to access the position database via the second communication path;

presenting the event data by using the interface unit to access the event database via second communication path;

send an electronic message based on information written on the product by the digital pen; and including the user-specific data in the electronic message.

* * * * *